United States Patent [19]
Motoyama

[11] Patent Number: 5,319,748
[45] Date of Patent: Jun. 7, 1994

[54] METHOD AND APPARATUS TO MANAGE PICTURE AND PAGESET FOR DOCUMENT PROCESSING

[75] Inventor: Tetsuro Motoyama, San Jose, Calif.

[73] Assignees: Ricoh Company, Ltd., Tokyo, Japan; Ricoh Corporation, San Jose, Calif.

[21] Appl. No.: 876,601

[22] Filed: Apr. 30, 1992

[51] Int. Cl.$^5$ .............................. G06F 15/20
[52] U.S. Cl. ...................... 395/162; 395/101; 395/144
[58] Field of Search ............ 395/101, 115–117, 395/145, 147, 148, 162, 164–166, 144; 340/723, 747; 364/200 MS, 900 MS

[56] References Cited

U.S. PATENT DOCUMENTS 4,649,513 3/1987 Martin et al. ............... 364/900
4,870,611 9/1989 Martin et al. ............... 364/900

OTHER PUBLICATIONS

"Interpress, The Source Book" by Harrington et al. (Simon and Schuster, Inc. 1988).
"PostScript Language Program Design", Second Edition, Addison-Wesley Publishing Company (1991).
ISO/IEC DIS 10180, Information Processing—Text Communication—Standard Page Description Language, Mar. 1991.

Primary Examiner—Dale M. Shaw
Assistant Examiner—Kee M. Tung
Attorney, Agent, or Firm—Oblon, Spivak, McClelland, Maier & Neustadt

[57] ABSTRACT

A printer/display control apparatus for processing documents represented in a structured hierarchical page description language. The documents are provided as a document data stream defined by a hierarchical structure having as a top level a "Pageset" of "Picture". Both the Pageset and the Picture consist of an optional Prologue or an optional Prologue and an optional Body. The Body of a Pageset consists of zero or more Pagesets or Pictures. The Body of Picture consists of zero or more Pictures or Tokensequence. Each Picture or Pageset has a "begin" and "end" used to define in a document data stream the beginning and end of the definitions that make up that entity. This invention provides an efficient method to process the "begin" and "end" of the document data stream.

23 Claims, 13 Drawing Sheets

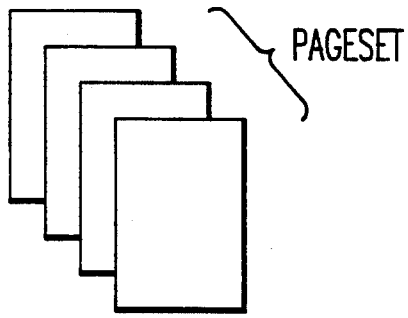
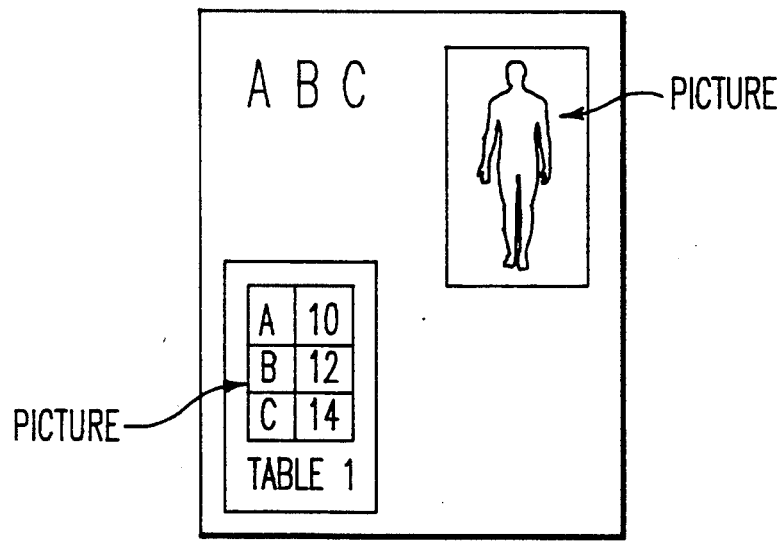
FIG. 1

```
Picture   :: = (prologue)?, (picture_body)?
Pageset   :: = (prologue)?, (pageset_body)?
Prologue  :: = (external_decl*, informative_decl*, resource_def*,
                resource_decl*, doc_prod_instr_decl*,
                context_decl*, dict_gen_decl*,
                set_up_proc*)
``` picture_body (picture | tokensequence)*
pageset body = (pageset | picture)*

```
,   ALL MUST OCCUR IN THE ORDER SHOWN
|   ONE AND ONLY ONE MUST OCCUR
?   OPTIONAL (0 or 1 TIME)
*   OPTIONAL & REPEATABLE (0 or MORE TIMES)
```

*FIG. 3*

METHOD AND APPARATUS TO MANAGE PICTURE AND PAGESET FOR DOCUMENT PROCESSING

BACKGROUND OF THE INVENTION

1. Field of the Invention

This invention relates generally to the computer controlled printing, displaying or other presentation of documents which may have text, graphical components, and/or images and more particularly to a method and systems for processing the beginning and ending of pictures or pagesets in a document data stream, as well as other data which might be defined in the document data stream. This invention also relates to methodology for keeping track of the scope or status of the presentation device. In this context the presentation of a document on a page involves the printing on a fixed medium such as paper, transparency or the like, the page, or presenting on a visual display the page or transmitting to another device the document in a form to be presented or stored. The present application is related to commonly owned co-pending U.S. patent application Ser. No. 07/778,578 filed on Oct. 17, 1991, the disclosure of which is incorporated by reference herein. The present application is also related to commonly owned concurrently filed U.S. patent application Ser. No. 07/876,251 entitled "A Method and System to Handle Inclusion of External Files into a Document Processing Language", filed Apr. 30, 1992, also incorporated by reference herein.

2. Discussion of the Background

The development of laser printers in the early 1970s provided an opportunity for high quality and low cost printing of documents which contain not only character data but also generalized graphical material. The primary method of controlling these types of printers was by means of commands employing a so-called "escape sequence", which commands are similar to the type of commands used in a DIABLO ® command sequence. These commands were distinguished from typical character data in a data stream by preceding the command with a special byte, generally an escape character (ASCII 27). This methodology was acceptable for low speed devices and for devices which print limited amounts of graphics, such as daisy wheel or dot matrix printers, but was not well suited for printing documents that combine significant amounts of text and graphical materials because no provision was made for the large amount of data that a graphic might employ.

In response to the limitations inherent in the escape sequence type of control, different types of "page description language" (PDL) were developed in general to control laser or other types of page printers. A backward compatibility was provided in most of these laser printers in that they were able to simulate conventional escape sequence commands such as might be found in the aforementioned DIABLO ® or EPSON ® type of printers. Examples of the conventional page description language which were developed in response to the limitations inherent in escape sequence commands were the PostScript ® system from Adobe Systems, Inc. and Interpress ® from Xerox. Other types of proprietary PDL's were also created to circumvent the limitations attendant to the use of escape sequence commends.

One of the shortcomings of the conventional page description languages such as PostScript ®, becomes evident in relation to the provisions that are made so that a particular document may contain a new definition, such as a new resource definition (e.g., an additional font or graphic which is to be used in the document) or a new dictionary definition. These new definitions might appear anywhere within a document data stream and are difficult to process and identify. As a result, the entire contents of a document must be inspected in order to determine whether or not a given printer has resources which are capable and necessary to print a particular document or to process the document in the manner desired. As a consequence, it is possible for the printing of a document to fail at any point during the printing process, including near the very end of processing, due to the inability of the printer to comply with the commands contained within the document's page description language.

Another problem associated with a PostScript ® type system is that in order to print a given page of a document, if it is not the first page, it is necessary to read the entire PDL description of all the preceding pages of the document in order to determine the state of the document page set up parameters (i.e., resource declaration, dictionary definition or the like) before the processing for a specified page can be accomplished. In other words, the print controller or a print driver program must read the entire PDL document data stream to take into account the effect of every page set up command which might change the state of the printing between the beginning of the document and the specified page. Although this scanning is relatively straightforward, it requires a significant amount of processing and consequently is an ineffective solution to the problem. It further is complicated in that identification of the beginning and end of pages and graphics in PostScript ® documents is not very straightforward and involves significant processing. PostScript developed the Document Structuring Convention using comments to distinguish various resources and page breaks. However, this is the convention and there is nothing in the description language to enforce this convention. The violation of convention does not flag the errors.

The prior art page description languages including PostScript and InterPress providing various improvements to the conventional escape sequences, such as providing tools for such items as resource declarations, context declarations, dictionaries, the use of memory stacks or the like. These languages also in some cases allowed for dynamic changes in the printers state such as the ability to add fonts or to add graphical images to the resources that might be available to the printer. Some of these features are documented in such generally available reference works as Adobe System Incorporated's "PostScript Language Reference Manual" and the "PostScript Language Program Design", both by Addison-Wesley Publishing Company. Other PDL's are likewise described in various technical and reference books such as "Interpress, The Source Book" by Harrington et. al. (Simon and Schuster, Inc. ,1988)

One of the problems as noted above with respect to the PostScript system is that an identification of the beginning and end of an image or a page requires a significant amount of processing and these languages do not provided a logical manner in which the preparation of the document may require significant extra processing to determine these items. In fact a processing "as if printing" of the entire document is needed even if only one page or a section of pages such as a chapter in a long document are needed. Further the processing may not be straightforward or simple enough to allow for lower cost processors to be used at the printer/display device. This problem adds to the cost or reduces the flexibility of the prior art systems. A basis for a proposed standardized page description language has been made by several people including the inventors herein and is in the process of being developed as an international standard. The proposal at this stage is in draft form before a section of the ISO as ISO/IEC DIS 10180 labeled as "Information Processing- Text Communication- Standard Page Description Language". The current draft is dated 1991.

SUMMARY OF THE INVENTION

Accordingly, one object of this invention is to provide a method and apparatus for the determination and the efficient processing of the beginning and ending of pictures and/or pagesets in a document data stream so as to speed up the processing of document data streams.

It is another object of this invention to provide an efficient method and apparatus which can keep track of the scope and status of material defined within the definition for each document data stream (called prologues) in an efficient manner.

It is yet another object of this invention to provide an apparatus and methodology for selecting in an input data document stream a given page or picture for processing in an efficient manner without the requirement of processing all preceding pages in the document.

These and other objects are achieved according to the present invention by providing an efficient method of processing in DIS 10180. According to DIS 10180, each document data stream is provided in a structure which is either a pageset or a picture. The pageset and a picture elements consist of an optional prologue which contains definitions and declaratory commands and an optional body. A pageset body consists of zero or more pagesets or pictures while a picture body consists of zero or more pictures or tokensequences. The tokensequence which contain specific tokens or commands for defining specific images along with necessary operators is called Content while other elements are called Structure. The Structure sets up the environment for Content to generate the appropriate output images. The effects of prologue within a picture or a pageset is until the end of the picture or the pageset. Therefore, the prologue of a picture in the hierarchical tree does not influence the peer picture, while the prologue of a parent picture or pageset influences the child-pictures. This invention efficiently handles this hierarchical tree structure along with the scope of the prologue by using a stack and various pointers.

A tree-linked hierarchy advantageously enables the processing of any portion of the document by directly addressing that portion of the document and those portions which are higher in the hierarchy without the necessity of processing the other items in the different branches of the hierarchical tree. In other words, only structural definitions which occur in the hierarchical tree which are above a given portion of the document need be processed. This increases the efficiency of the processing of the document and also facilitates the determination of the type of resources which will be needed in the printing device or the display device prior to the commencement of the actual printing of the document. This increases the speed and efficiency by which the various devices print or display the document.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an illustration of the basic structure of a document data stream where a document is defined as either a pageset or a picture as represented in the structured standard page description language form of this invention;

FIG. 3 is an illustration of a representative grammar of a picture and pageset according to the structure shown in FIG. 2;

DETAILED DESCRIPTION OF THE PREFERRED EMBODIMENTS

In reference to FIG. 1 a basic document data stream layout is shown in which a document may be defined as being a grouping of Pagesets. With a reference now to FIG. 11, it is clear that a target system which is to accept the document's data stream will have generally at least a CPU, memory generally in the form of ROM and RAM, input/output means to receive the document data stream, and a means for displaying/printing a resultant output. The resultant output image may be produced by an image raster device which may be directly connected to the CPU or may have its own distinct native type of imaging which would then, of course, require a translation of a document data stream into the type of imaging commands which the individual imaging device might have. An example of this might be a PostScript ® type of device connected to a system which transmits the document description data stream as called for in this invention and which then processes and prints the data after a translation into PostScript ® language. This, of course, allows for means of supporting existing printers.

As stated above individual document description data stream may be defined as either a pageset or a picture, as shown in FIG. 1. When a document is defined as a picture, the document would then be a one page or single page document. An individual document may be made up of a single picture (page) or a single pageset. A picture, however does not cross pages.

Figure 2:
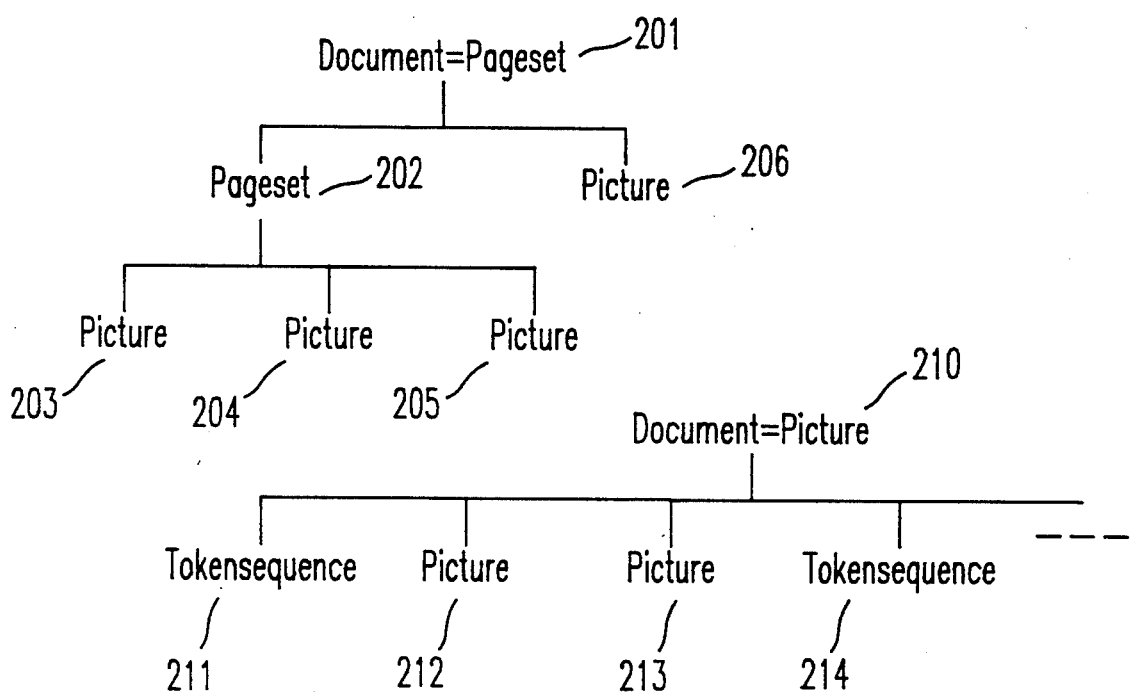
FIG. 2 is an illustration of the hierarchical structure of a document shown in FIG. 1.

The hierarchical structure of a document data stream such as is shown in FIG. 1 is illustrated in FIG. 2. Pages are defined as, and are set as, the highest level within a picture hierarchy. Tokensequences (211) and (214) are individual elements which may describe portions of an individual page. These may be, for example a drawing, text or image. Other portions of the document are also handled by way of tokensequences which create image descriptions which are used to define individual elements within a picture. The translation of pictures into a tokensequence allows for a more efficient processing of the document data stream and also allows for a rapid change of elements within a document data stream, if needed or desired, far easier than has been available in prior art systems.

For purposes of this discussion and in particular with reference to FIGS. 2 and 13 the "clear text" processing will be shown, however it should be apparent based upon the token structure and stack implementation discussed below a binary data stream having, for example, a first set of information in binary form as to its type, its value and then a length indicator the processing that will occur will be identical.

As shown in FIG. 3, the picture and pageset have a set "grammar" where a picture is defined as having an optional prologue and an optional picture body, a pageset is defined as having an optional prologue and an optional pageset body, and a prologue has elements such as an external declaration, informative declaration, resource declaration, document production instruction declaration, context declaration, dictionary generation declaration or set-up procedure. All of these elements in the prologue are optional and, in fact, may be repeated in the sense that there may be multiple instances of the same item. Consequently, multiple levels of a prologue may be present and the handling of these multiple instances can be accomplished as set forth below.

A picture body is made up of a picture or tokensequence which may occur either zero or more times as does the pageset body which has pagesets or pictures which may occur either zero or more times. FIG. 3 illustrates that a picture consists of an optional prologue and optional picture_bodies, and a pageset consists of optional prologues and optional pageset_bodies. Each prologue consists of zero or more prologue elements with a picture_body consisting of zero or more picture or tokensequences as shown as 210 of FIG. 2. If a picture is present in the definition or data stream making up the picture_body that picture will be placed one level below the parent picture in the hierarchial structure as shown in FIG. 2. A Pageset body may consist of zero or more pagesets as shown in element 201 of FIG. 2.

Figure 4:
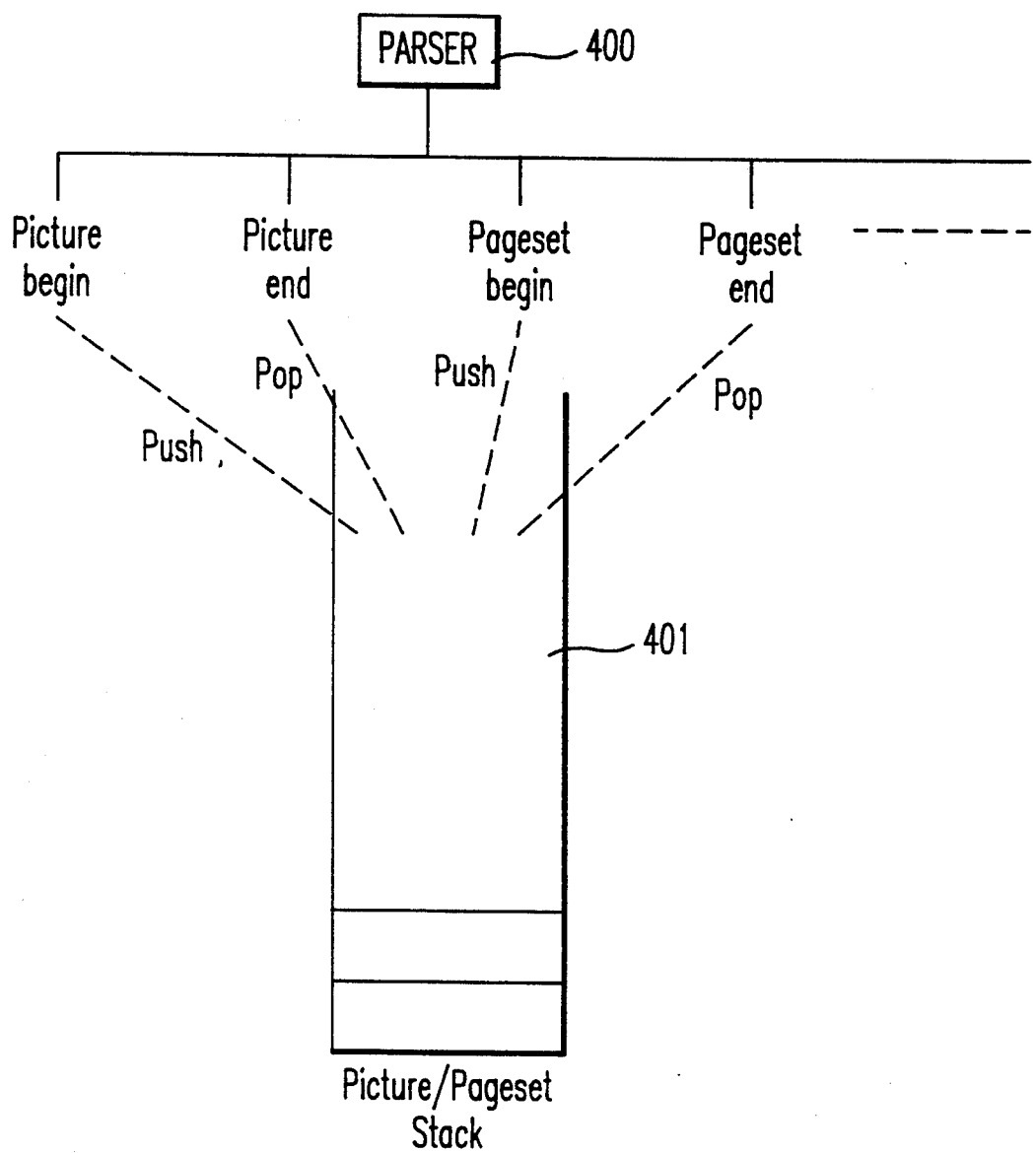
FIG. 4 is a schematic illustration of the general architecture of the picture pageset stack arrangement according to this invention.

The general architecture of the system and the data structure is shown in FIG. 4. The parser 400 accepts a byte stream and identifies various tokens. In the context of this disclosure, the most important tokens processed by the parser are the picture_begin, picture_end, pageset_begin and pageset_end. When these tokens are recognized by the parser 400, the parser will call an appropriate routine to handle the processing of the data stream and to set up a structure as is shown in FIG. 13 for example. A conventional type of parsing which is easily implemented, either in software or in hardware is used at this point. Accordingly, no further discussion of parsing is made here for the sake of brevity.

Figure 11:
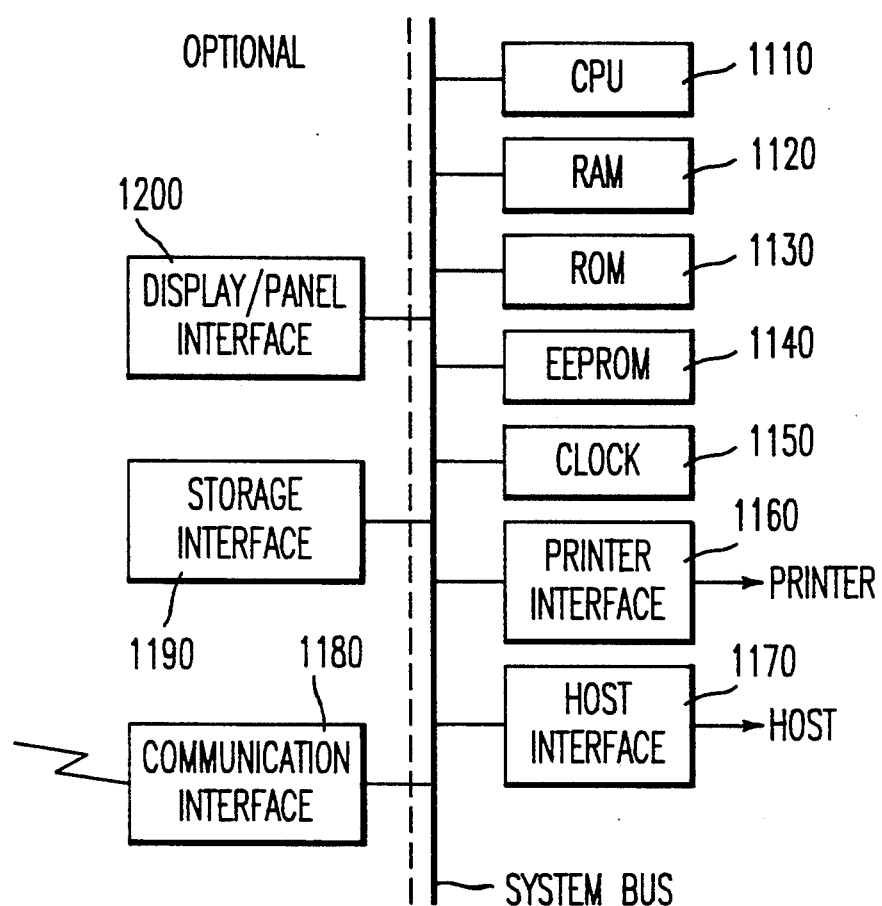
FIG. 11 is an exemplary implementation of this system in either a host computer, print server or printer controller for this invention.
Figure 13:
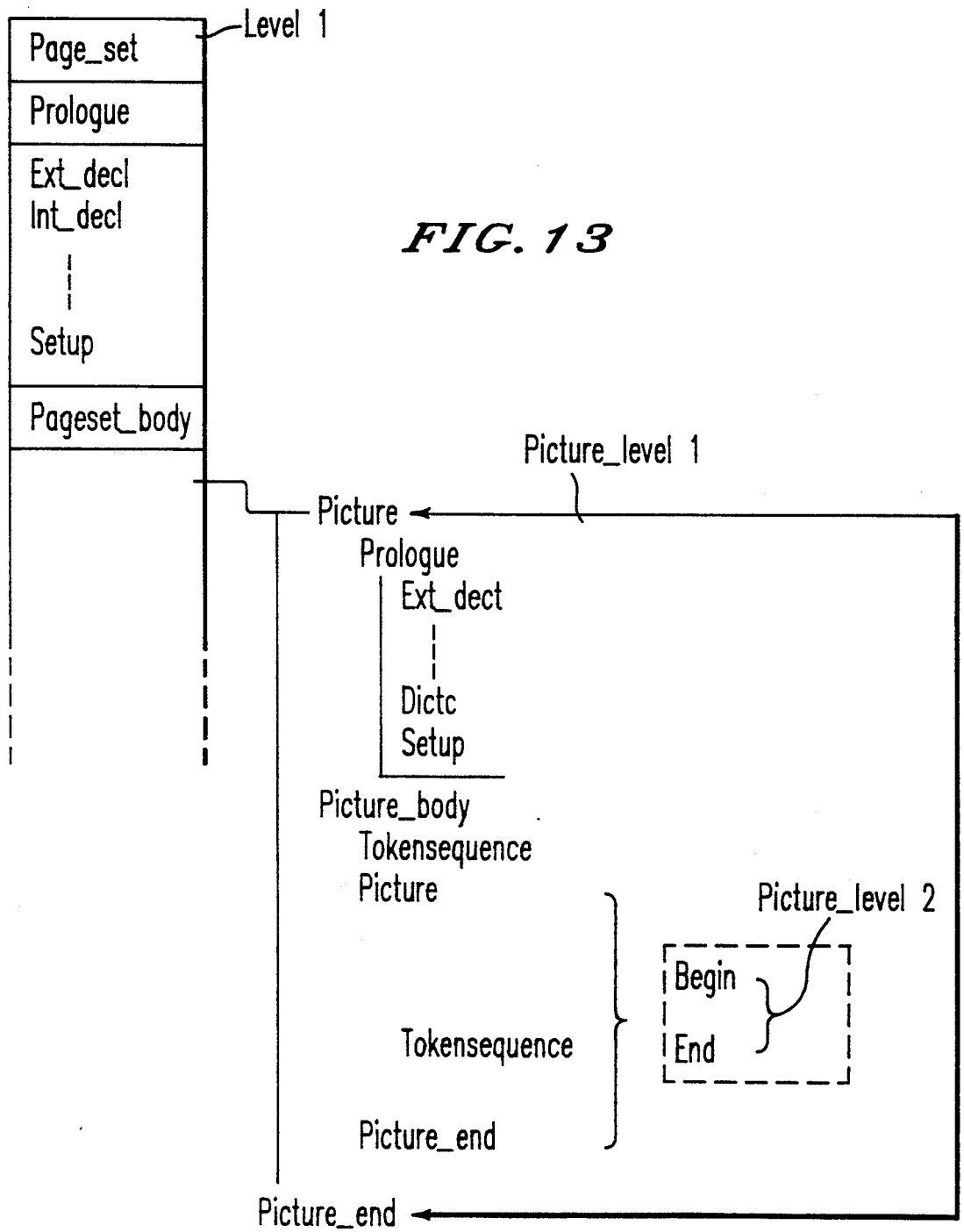
FIG. 13 is an expanded top level breakdown of a document data stream, such as is shown in FIG. 2 as processed by this invention.

When a "begin", for example, as shown in FIG. 13 is encountered and is recognized by the CPU 1110 of FIG. 11 and more particularly to that portion of the CPU 1110 which acts as a structure processor, an appropriate pointer is pushed onto a picture pageset stack (401). It should be noted that the functions of the structure processor may be implemented in CPU 1110 or can be implemented in a separate, but connected processor, however for simplicity it can be assumed that the structure processor is implemented as part of the operation functions of CPU 1110. When an "end" is recognized, an appropriate pointer is popped from the stack and the necessary memory is erased. In a clear text encoding of a document, <picture> and <pageset> tags may, for example, be used to denote a beginning while <picture> and <pageset> may be used to denote an ending. In a binary encoding scheme for the document data stream, special tags along with a byte count may be used to identify a "begin" and "end" condition for a picture and pageset. Accordingly, a stack arrangement employing push and pop techniques being used for the manipulation of items within the stack may be employed to determine the beginning and end of a given pageset or picture, which allows for the handling and identification of the "begins" and "ends" in a very expeditious manner.

Figure 5:
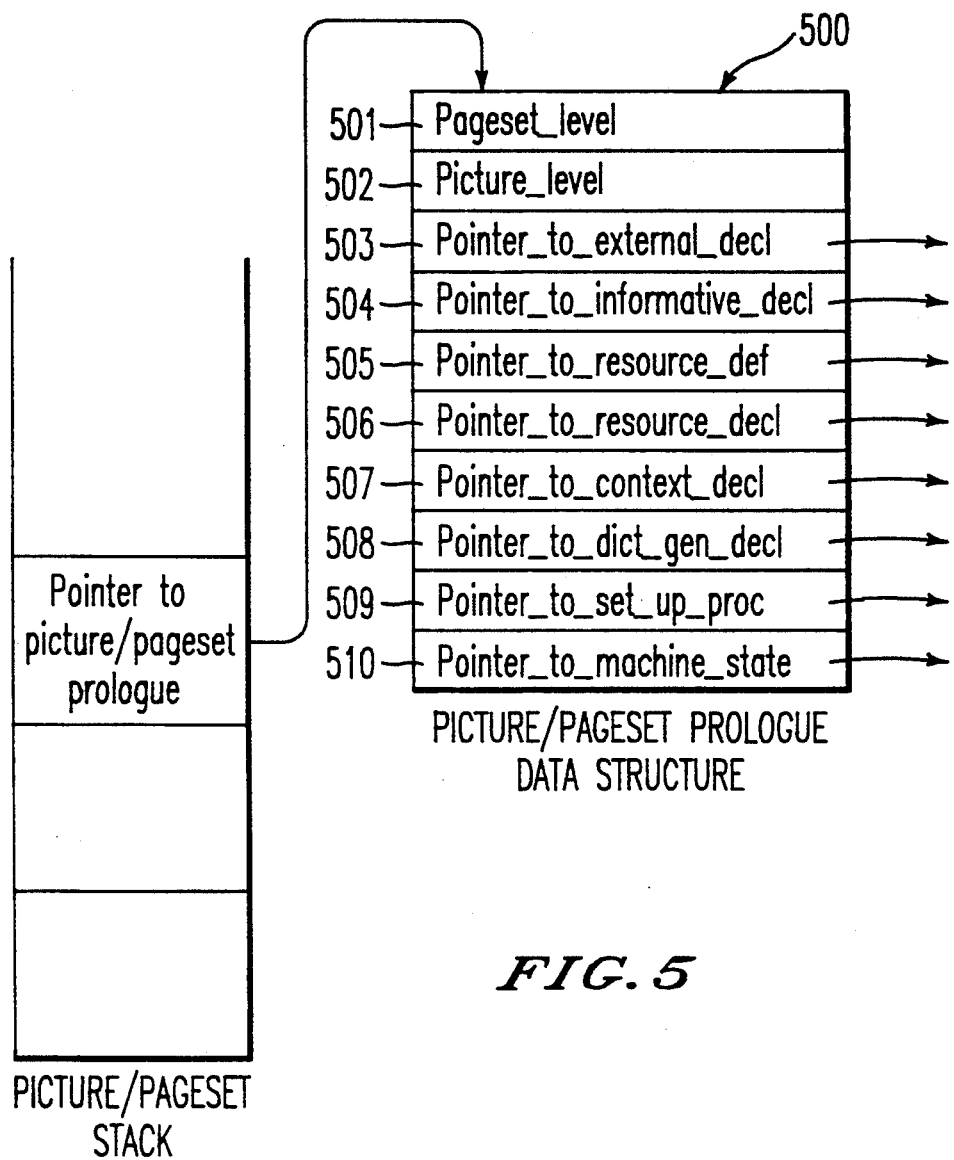
FIG. 5 is an illustration of the structure of a picture pageset prologue data structure and the linked list that accompanies this structure.

As shown in FIG. 5, a pointer to a picture/pageset prologue contains a series of pointers which may be set to "null" or to the memory allocated for external declarations, informative declarations, resource definitions, resource declarations, context declarations, dictionary generation declaration, set-up procedures or machine states, as may be necessary. As these items are optional in nature and may occur either zero or more times, a pointer arrangement is used in this invention to allow for multiple instances to occur or for zero instances to occur without the resultant waste of memory that might occur if this were not the case. If zero instances are the case, the value of the pointers is "null" and, of course, no memory need be allocated for these items. These pointers are identified by means of reference numeral designations 503 through 510 in FIG. 5. Numeral 501 in FIG. 5 refers to the pageset level and numeral 502 refers to the picture level of the individual picture/pageset prologue which allows for an expeditious processing of the individual picture/pagesets in the structure.

This identification that occurs with respect to each of the levels 501 and 502 in FIG. 5 becomes important when one understands that an individual page to be processed may have many constituent parts, such as is shown in FIG. 13. The Picture_levels processed in FIG. 13 will vary from a top level of one to a lower level of two, however it is apparent that the level may in a more complex page having graphics containing other graphics or the like to have many Picture_levels and that the level for processing purposes may increase substantially beyond two. In fact by having the stack arrangement, the limits on the number of levels becomes virtually unlimited and is only limited to the amount of memory 1120 available to the stack used by the CPU 1110 of FIG. 11.

Figure 6:
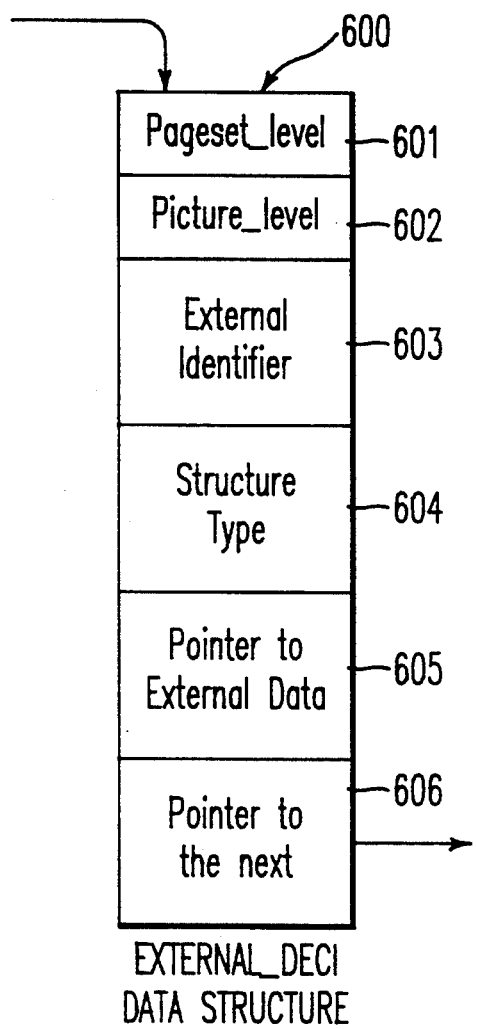
FIG. 6 is an illustration of the data structure of the link list which supports a connection to an external declaration which can be included into a document data stream.
Figure 12A:
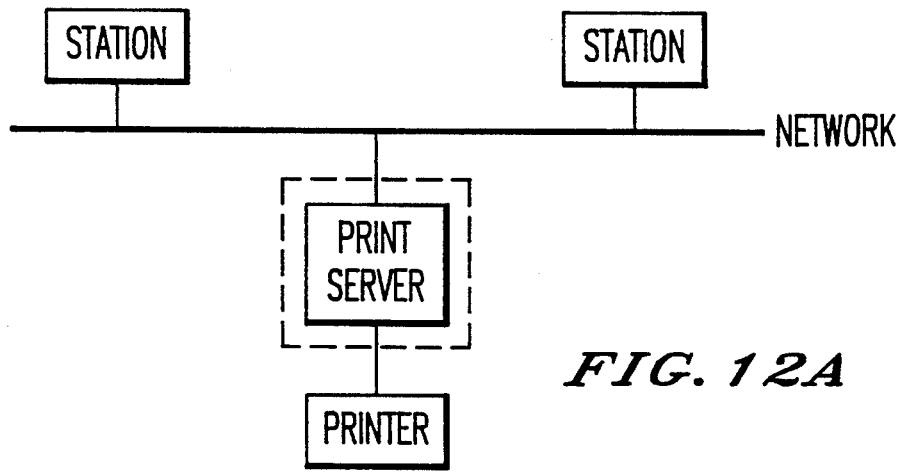
FIGS. 12A, 12B, and 12C are drawings showing three possible implementation environments.
Figure 12B:
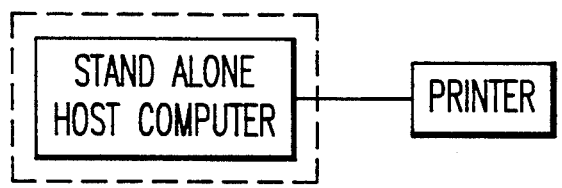
Figure 12C:
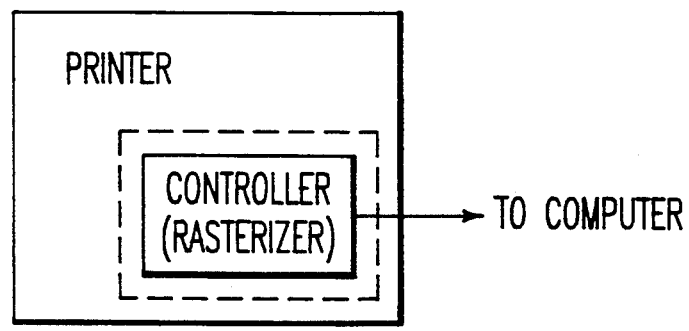

As shown in FIG. 6, a linked list is used to keep track of the individual items within the structure shown in FIG. 5. A pointer, for example, to an external declaration 503 shown in FIG. 5, is used as an example in FIG. 6. It should be noted that the pointers 504 through 510 would be handled in a similar manner as the pointer 503. All the pointers 503 through 510 in FIG. 5 have pageset levels and picture levels included in the data structure which will allow the memory allocated to these items to be released when an "end" is recognized for a given pageset or picture. This allows for a greater use of available memory resources by allowing the "reuse" of memory through conventional memory "garbage" collection procedures. It further allows for a type of internal error checking to occur in that a mismatched group of "begins" and "ends" can be easily determined by the CPU 1110 of FIG. 11 and more particularly to that section of the CPU 1110 which may be acting as a structure processor. This type of arrangement may be as shown in the embodiments of FIGS. 12A, 12B and 12C where the processing can be accomplished in many different forms or environments, for example, at the printer end, the main processor end (i.e. the document data stream creator) or at some other location in between.

As shown in FIG. 6 the pointer 503 from FIG. 5 points to a data structure of a link list. In the structure 600, 601 is the Pageset_level for the external declaration. The Picture_level 602 is also present in this link structure. An external identifier 603 and the structure type 604 are likewise provided. The pointer to external data 605 allows for the allocation of memory for the external data itself and 606 allows for a linking of multiple external declarations by providing a pointer to the next group of elements which would be similar to the element 600 but would be for the next level "down" in the data structure.

Figure 7:
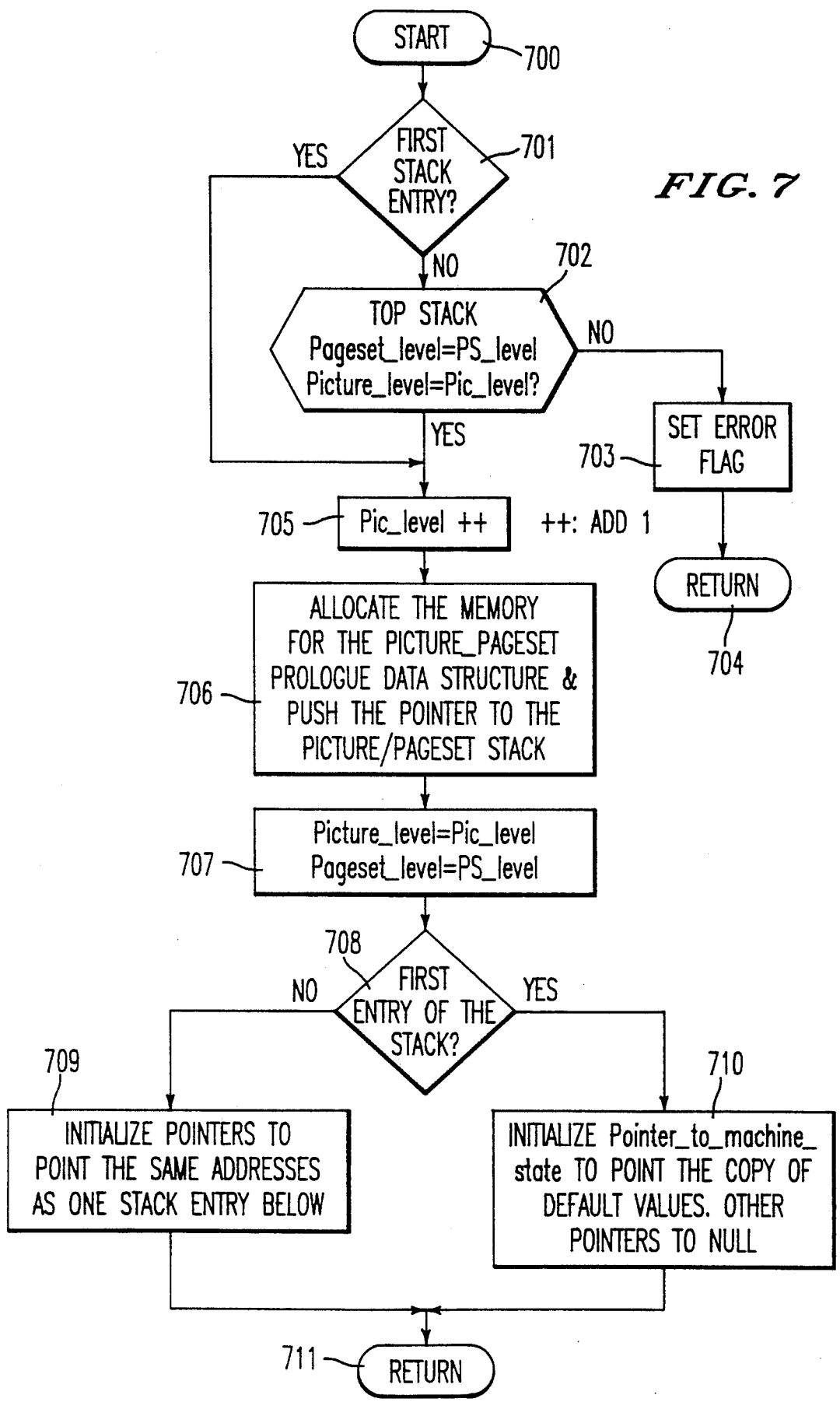
FIG. 7 is a flow chart of the processing necessary for the processor to handle the beginning of a picture.

The processing that is necessary for a picture_begin routine is shown in FIG. 7 and in FIG. 13. Global variables such as the picture level (Pic_level) are available for use by any of the routines while the Picture_level (501) and the Pageset_level (502) are local variables contained within the data structure (500) pointed to by the entry in the picture/pageset stack (401) found in FIG. 4. After starting in step 700, in step 701 the Pic_level is initialized to zero at the initialization of all processing for a document data stream or on "power up". An error check occurs in step 702 and an error flag is set in step 703, if a problem occurs, followed by a return to other processing by the CPU 1110 of FIG. 11 in step 704. Otherwise processing continues and the global variable Pic_level is incremented at step 705. When the selection of pages is needed, the following process should be inserted after step 705. [If (Pic_level==1) then page-number++]This means, after step 705, that Pic_level is examined to see if it is one. If it is one, then the "picture begin" denotes the beginning of the highest level of picture hierarchy, that is, start of page. Therefore the page-number is incremented. "Page-number" is initialized to be zero at power on initialization or at a reset. The "Page-number" should be a global variable which can be accessed by any routine. This return allows for the continuation of processing of the document data stream. As the Pic_level is a global variable, this level is available through all other routines and allows for multiple levels to be implemented. An allocation of memory occurs in step 706 for the picture/pageset prologue data structure (500) from FIG. 5. A pointer to the data structure is pushed to the stack (401) in step 706. The Picture_level and the Pageset_level of the data structure (500) are set in step 707. Then, in step 708, it is determined if the entry is the first entry of the stack. If so, in step 710 a pointer_to_machine_state is set to point to the copy of the default values for the display/print device and the other pointers are set to null. If not, in step 709, all pointers are set to point to the same objects as the one entry which is below that entry in the stack. This allows for an efficient "search" through the stack by the structured processing routines/section of CPU 1110. It should be noted at this point that the structure processing that occurs in processor 1110 of FIG. 11 may also be accomplished by a separate processor working in conjunction with the CPU 1110 of FIG. 11, although in a general scheme this would not be necessary.

Figure 8:
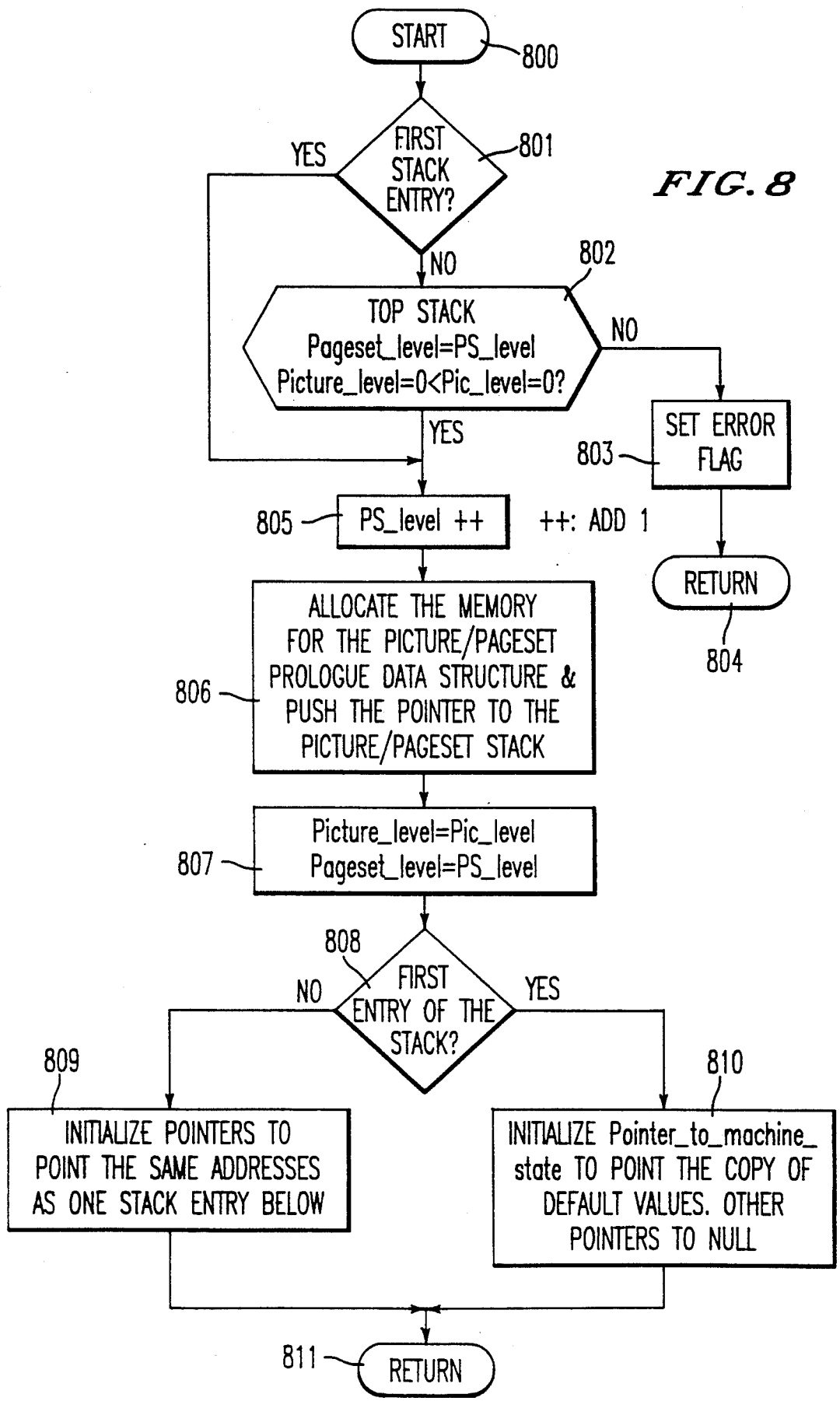
FIG. 8 is a flow chart of the routines necessary for the processor to handle the beginning of a pageset.

As shown in FIG. 8, the processing that occurs for a "Pageset begin" is similar to that shown in FIG. 7 except that the error check is to the PS_level in 802 and it is the PS_level that is incremented in step 805. Otherwise, processing is the same for Pagesets and "Picture" and is not further discussed for the sake of brevity.

Figure 9:
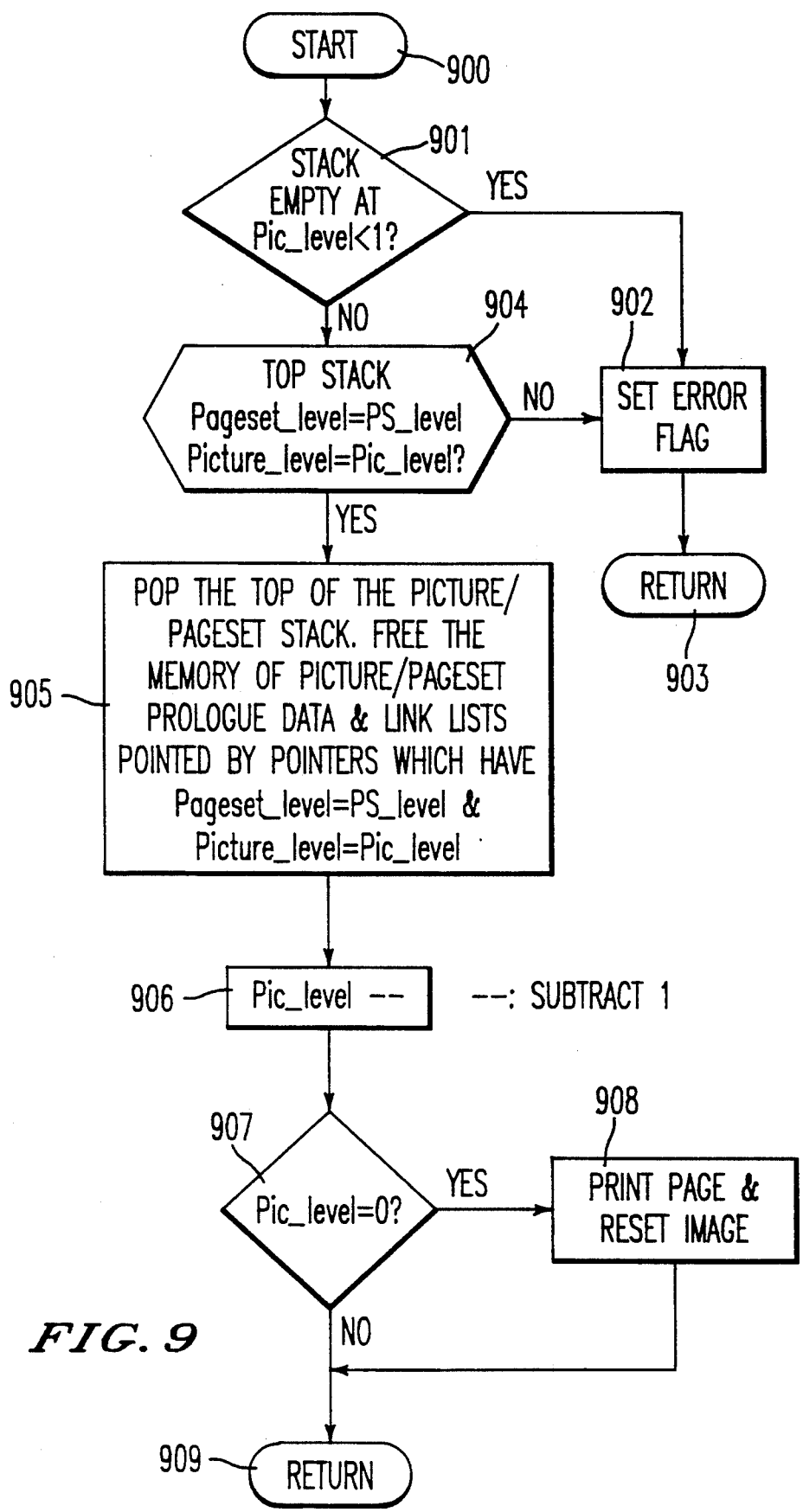
FIG. 9 is a flow chart showing the processing necessary for a picture end routine.
Figure 10:
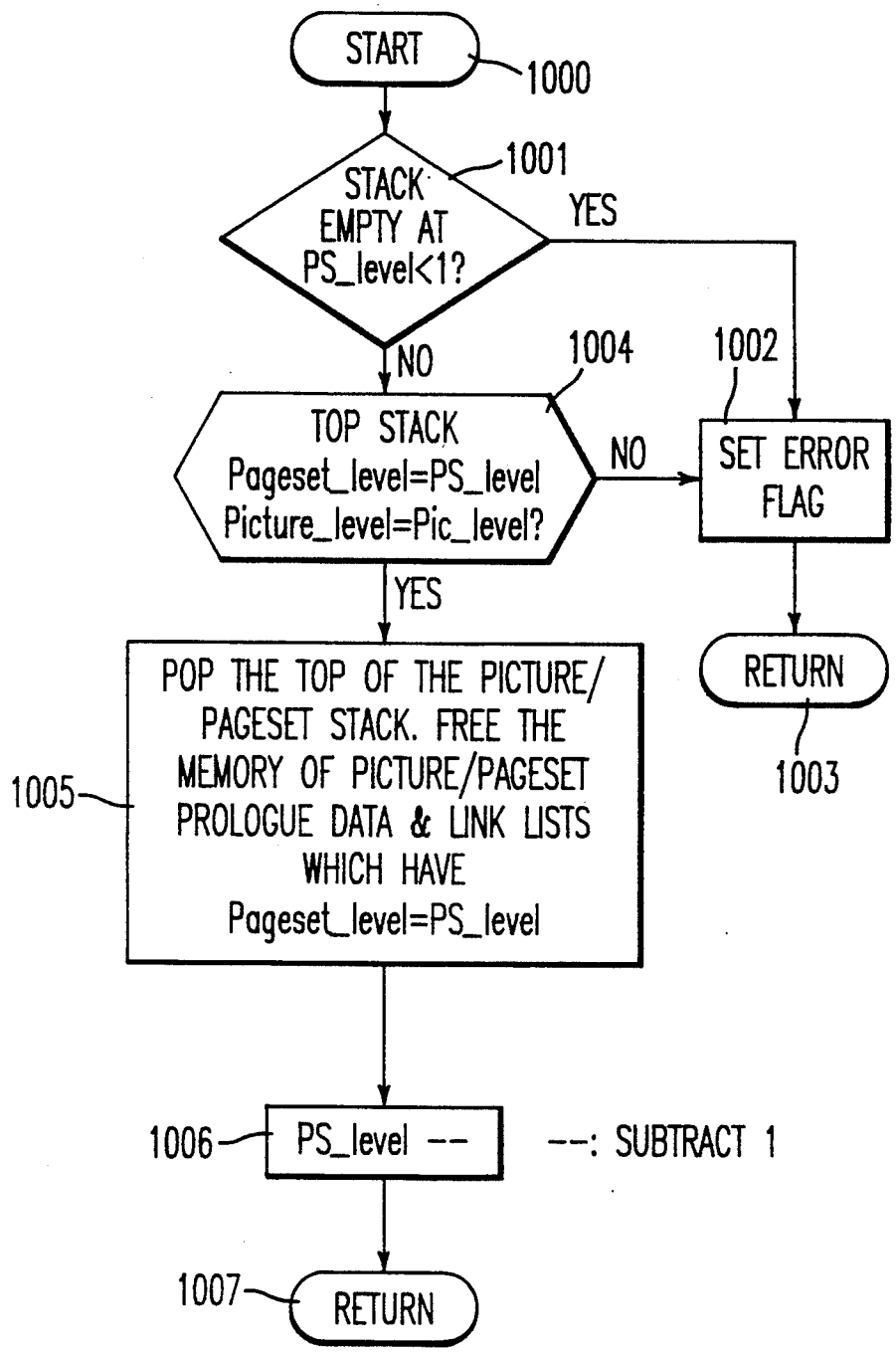
FIG. 10 is a flow chart of the processing necessary for a pageset end routine.

FIGS. 9 and 10 illustrate the processing that occurs as a result of an "end" routine. As shown in FIG. 9, after start (step 900) the condition of the stack is checked in step 901 with the current Pic_level to ensure the correct use of the picture structure in the document data stream and to detect and to note any possible corruption of the data. This becomes especially important if the document data stream is not in clear text but rather is a binary data stream in which the length of the data stream is not known or is known incorrectly due to faulty transmission or the like. An error checking also occurs in step 904 before proceeding to the actual processing of the "picture-end" command. The error flag is set in step 902 with a return to processing occurring in step 903. The top entry of the picture/pageset stack 401 will be popped in step 905 and consequently the memory which was previously being used is freed for "garbage collection". The related memory in the picture/pageset prologue data structure pointed to by the popped entry and the link list pointed to by the pointers in the data structure which have a Pageset_level equal to PS_level and the Picture_level equal to Pic level is accomplished and the Pic_level is then decreased by one in step 906. In step 907, it is determined if the resulting Pic_level is then zero. If so, in step 908 the picture which has just been processed is the highest level picture (i.e., a page) the image data may then be forwarded to the output device for printing/display and the image data area will be reset indicating that a new page is to be processed. If selection of pages is needed, the "page-number" should be examined in step 908 to determine if the page-number is among the selected pages.

The flow that occurs in FIG. 10 is similar to that as shown in FIG. 9 except the picture and error checking as shown in steps 1001 and 1004 relate to the pageset end, and the pageset level decrement in step 1006 does not cause the printing of a page or an image reset as does steps 907 and 908 in the picture_end routine discussed in FIG. 9.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. An apparatus for control of the-presentation of a document by a presentation device, comprising:
   input means for accepting an input document data stream defining said document, said data stream composed of a picture or a pageset with a hierarchically ordered structure;
   said picture comprising zero or more prologue and zero or more picture body, and said pageset comprising zero or more prologue and zero or more pageset body;
   said picture body comprising zero or more tokensequences and zero or more pictures;
   said pageset body comprising zero or more pictures and zero or more pagesets;
   structure processing means coupled to said input means to determine pageset definitions or picture definitions to detect a begin and an associated end of each pageset definition or picture definition, for processing each prologue in the determined pageset or picture definitions, for ordering body portions between each detected begin and associated detected end in an ordered hierarchy, and for generating and outputting output document instructions for controlling said presentation device; and
   output means coupled to said structure processing means for applying said output document instructions to said presentation device.

2. An apparatus for control of a presentation of a document by a presentation device, comprising:
   input means for accepting an input document data stream defining said document, said data stream composed of a hierarchically ordered set of one or more prologues each having zero or more associated content portions;
   structure processing means coupled to said input means for processing each prologue to determine pageset definitions and picture elements of said document data stream, for processing the determined pageset definitions to detect a begin and an associated end of each pageset definition, for ordering content portions between each detected begin and associated detected end in an ordered hierarchy, and for generating and outputting output document instructions for controlling said presentation device; and
   output means coupled to said structure processing means for applying said output document instructions to said presentation device.

3. The apparatus as in claim 2, further comprising:
   means for controlling a scope in said ordered hierarchy of a given pageset and picture.

4. The apparatus as in claim 2, wherein said means for controlling comprises:
   a stack memory means.

5. An apparatus as in claim 2, further comprising:
   storing means coupled to said structure processing means for storing said zero or more associated content portions defined by a processed prologue.

6. An apparatus as in claim 5, further comprising:
   syntactic analysis section means for checking syntactic correctness of each detected begin and its associated end of each pageset definition.

7. An apparatus as in claim 5, wherein said structure processing means comprises:
   stack memory means for controlling a hierarchical ordering of said zero or more content portions stored by said storing means.

8. An apparatus as in claim 7, wherein said stack memory means employs a pointer structure to maintain identification of said stored items.

9. An apparatus as in claim 7, wherein said stack memory means comprises:
   a stack memory which stores a linked list of pointers identifying the ordered hierarchy and thereby providing a search path defined by said linked list of stored pointers.

10. An apparatus as in claim 7, further comprising:
    means for releasing for reuse stored pointers in the ordered hierarchy corresponding the content portions of the document data stream that are at a lower level of said hierarchy relative to the content portions of the presented page in the ordered hierarchy after presentation of a page defined by said pageset definition and the presentation of all pages in the document data stream which are at a lower level in the ordered hierarchy.

11. The apparatus as in claim 2, further comprising:
    means for storing and presenting a page number.

12. The apparatus as in claim 2, further comprising:
    means for selectively presenting pages from said inputted document data system.

13. An apparatus for controlling a presentation of a document by means of a presentation device, comprising:
    input means for accepting an input document data stream defining said document, said data stream comprising at least one prologue and zero or more associated content portions;
    CPU means coupled to said input means for processing said data stream and producing output document instructions based on the processed data stream, comprising,
    means for ordering addressing of said at least one prologue and associated content portions in an ordered hierarchy, and
    means for processing at least one prologue and associated content portions in said ordered hierarchy to produce said output document instructions; and
    output means coupled to said CPU means for applying said output document instructions to said presentation device for the presentation of the document represented by said output document instructions.

14. The apparatus according to claim 13, wherein said ordering means comprises:
    stack memory means for storing pointers allocating memory locations for storage of prologues and associated content portions in a retrieving sequence defined by said pointers.

15. In a method for controlling a presentation of a document defined by a document data stream, the improvement comprising the steps of:
    (a) inputting to a processor unit a document data stream defining a document to be presented, said document data stream including pageset definitions, each pageset definition including a begin, zero or more picture elements and an end, said picture elements comprising zero or more prologues, each prologue comprising zero or more prologue elements and content portions, said content portions containing image defining tokensequence elements;
    (b) parsing said inputted document data stream to determine the begin and end of a prologue within said inputted document data stream to determine the existence thereof;

(c) allocating memory at a given hierarchical level of memory allocation ordering and storing in the allocated memory at said given hierarchical level document data defined between a given detected begin and an associated detected end of a prologue;

(d) pushing onto a stack a pointer identifying memory allocated at said given hierarchical level;

(e) allocating memory at a lower hierarchical level below the given hierarchical level and storing at said lower hierarchical level document data defined between a further detected begin, which is detected before the detected end associated with said given detected begin, and a detected end associated with said further detected begin; and (f) pushing onto said stack a pointer identifying memory allocated at said lower hierarchical level.

16. The method according to claim 15, further comprising the step of:

popping from said stack pointers corresponding to content portions of the document data stream that are at a lower hierarchical level relative to the content portions of the presented page upon the presentation of a page defined by said pageset definition and the presentation of all pages in the document.

17. The method according to claim 15, comprising: repeating steps (e) and (f) whenever a begin at a lower hierarchical level is detected before detection of an end associated with a detected begin at a higher hierarchical level.

18. A processor apparatus for control of presentation of a document defined by a document data stream, said processor programmed to perform the steps of:

(a) inputting to a processor unit a document data stream defining a document to be presented, said document data stream including pageset definitions, each pageset definition including a begin, zero or more picture elements and an end, said picture elements comprising zero or more prologues, each prologue comprising zero or more prologue elements and content portions, said content portions containing image defining tokensequence elements;

(b) parsing said inputted document data stream to determine the begin and end of a prologue within said inputted document data stream to determine the existence thereof;

(c) allocating memory at a given hierarchical level of memory allocation ordering and storing in the allocated memory at said given hierarchical level document data defined between a given detected begin and an associated detected end of a prologue;

(d) pushing onto a stack a pointer identifying memory allocated at said given hierarchical level;

(e) allocating memory at a lower hierarchical level below the given hierarchical level and storing at said lower hierarchical level document data defined between a further detected begin, which is detected before the detected end associated with said given detected begin, and a detected end associated with said further detected begin; and (f) pushing onto said stack a pointer identifying memory allocated at said lower hierarchical level.

19. A computer readable medium for storing a program for control of presentation of a document defined by a document data stream, said program defining the steps of:

(a) inputting to a processor unit a document data stream defining a document to be presented, said document data stream including pageset definitions, each pageset definition including a begin, zero or more picture elements and an end, said picture elements comprising zero or more prologues, each prologue comprising zero or more prologue elements and content portions, said content portions containing image defining tokensequence elements;

(b) parsing said inputted document data stream to determine the begin and end of a prologue within said inputted document data stream to determine the existence thereof;

(c) allocating memory at a given hierarchical level of memory allocation ordering and storing in the allocated memory at said given hierarchical level document data defined between a given detected begin and an associated detected end of a prologue;

(d) pushing onto a stack a pointer identifying memory allocated at said given hierarchical level;

(e) allocating memory at a lower hierarchical level below the given hierarchical level and storing at said lower hierarchical level document data defined between a further detected begin, which is detected before the detected end associated with said given detected begin, and a detected end associated with said further detected begin; and (f) pushing onto said stack a pointer identifying memory allocated at said lower hierarchical level.

20. A method for processing a document in a hierarchically structured language, comprising the steps of:

determining a beginning of one of a picture and pageset structure elements in the document;

pushing onto a stack, an entry used for keeping track of processing parameters for a particular hierarchical level, said entry corresponding to said one of the picture and pageset structure elements; and processing said one of the picture and pageset structure elements;

popping said entry off of the stack after processing of said one of said picture and pageset structure elements is complete.

21. An apparatus for processing a document in a hierarchically structured language, comprising:

means for determining a beginning of one of a picture and pageset structure elements in the document;

means for pushing onto a stack, an entry used for keeping track of processing parameters for a particular hierarchical level, said entry corresponding to said one of the picture and pageset structure elements;

means for processing said one of the picture and pageset structure elements; and means for popping said entry off of the stack after processing of said one of said picture and pageset structure elements is complete.

22. A method of processing a hierarchically structured document, comprising the steps of:

processing a first hierarchical level of the document using a first set of system parameters;

copying the first set of system parameters to a second set of system parameters;

processing a second hierarchical level of the document using the second set of system parameters, during which the second set of system parameters are modified;

continuing processing of the first hierarchical level of the document, after the processing of the second hierarchical level of the document, using system parameters which are equal to the first set of system parameters.

23. An apparatus for processing a hierarchically structured document, comprising:

means for processing a first hierarchical level of the document using a first set of system parameters;

means for copying the first set of system parameters to a second set of system parameters;

means for processing a second hierarchical level of the document using the second set of system parameters, during which the second set of system parameters are modified;

means for continuing processing of the first hierarchical level of the document, after the processing of the second hierarchical level of the document, using system parameters which are equal to the first set of system parameters.

* * * * *